(12) United States Patent
Drew et al.

(10) Patent No.: US 12,312,946 B2
(45) Date of Patent: May 27, 2025

(54) OIL AND GAS WELL MULTI-PHASE FLUID FLOW MONITORING WITH MULTIPLE TRANSDUCERS AND MACHINE LEARNING

(71) Applicant: Halliburton Energy Services, Inc., Houston, TX (US)

(72) Inventors: Julian Drew, Centennial, CO (US); David Diller, Greenwood Village, CO (US); Werner Heigl, Fulshear, TX (US); Richard Gibson, Jr., Littleton, CO (US); Barry Fish, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 17/832,393

(22) Filed: Jun. 3, 2022

(65) Prior Publication Data

US 2023/0144034 A1    May 11, 2023

Related U.S. Application Data

(60) Provisional application No. 63/263,898, filed on Nov. 11, 2021.

(51) Int. Cl.
*E21B 47/107* (2012.01)
*E21B 47/18* (2012.01)

(52) U.S. Cl.
CPC ............ *E21B 47/107* (2020.05); *E21B 47/18* (2013.01); *E21B 2200/22* (2020.05)

(58) Field of Classification Search
CPC ........ E21B 47/107; E21B 47/10; E21B 47/18; E21B 47/12; E21B 47/14; E21B 2200/22; G06N 3/0464; G06N 3/08; G01F 1/662; G01F 1/667; G01F 1/74; G01F 1/86
See application file for complete search history.

(56) References Cited

U.S. PATENT DOCUMENTS

| | | | |
|---|---|---|---|
| 2005/0205264 A1* | 9/2005 | Starr | E21B 33/134 166/243 |
| 2011/0122727 A1* | 5/2011 | Gleitman | E21B 47/14 367/81 |
| 2012/0146805 A1 | 6/2012 | Vick, Jr. et al. | |
| 2015/0021015 A1* | 1/2015 | Xiao | E21B 47/135 166/250.01 |

(Continued)

FOREIGN PATENT DOCUMENTS

EP    1250513 B1    4/2005

OTHER PUBLICATIONS

International Search Report and Written Opinion, PCT/US2022/032263, Sep. 19, 2022, 16 pages.

*Primary Examiner* — Yanick A Akaragwe
(74) *Attorney, Agent, or Firm* — Kilpatrick Townsend & Stockton LLP

(57) ABSTRACT

A method can be used to determine multi-phase measurements of fluid flowing with respect to a wellbore. Signals can be received, and the signals can be emitted by each variable frequency acoustic emitter of a set of variable frequency acoustic emitters positioned spaced apart in a sensing transducer that is in an interior of a wellbore. The received signals can be converted into a flow rate of each of a set of different fluid phases of a fluid in the wellbore. The multi-phase measurements of the fluid can be determined using the converted flow rate.

18 Claims, 11 Drawing Sheets

(56) References Cited

U.S. PATENT DOCUMENTS

| | | |
|---|---|---|
| 2017/0205260 A1* | 7/2017 | Jaaskelainen .......... G01H 9/004 |
| 2019/0120048 A1* | 4/2019 | Coffin ................ G01N 33/2823 |
| 2019/0203585 A1 | 7/2019 | Nguyen et al. |
| 2020/0209193 A1* | 7/2020 | Swett .................... E21B 47/103 |
| 2021/0047916 A1* | 2/2021 | Thiruvenkatanathan .................... E21B 47/135 |

* cited by examiner

OIL AND GAS WELL MULTI-PHASE FLUID FLOW MONITORING WITH MULTIPLE TRANSDUCERS AND MACHINE LEARNING

CROSS-REFERENCE TO RELATED APPLICATION

This claims priority to U.S. Provisional Application No. 63/263,898, filed Nov. 11, 2021 and titled "Oil and Gas Well Multi-Phase Fluid Flow Monitoring with Multiple Transducers and Machine Learning."

TECHNICAL FIELD

The present disclosure relates generally to wellbore operations and, more particularly (although not necessarily exclusively), to monitoring multi-phase fluid flow with respect to a wellbore using multiple transducers and machine-learning.

BACKGROUND

A wellbore can be formed in a subterranean formation or a sub-oceanic formation for extracting produced hydrocarbon material. The wellbore can be used to produce fluid, which can include more than one phase. For example, the produced fluid can include oil, water, gas, and other suitable phases of produced fluid from the wellbore. Unconventional and conventional wellbores can produce material from multiple zones or intervals of the wellbore. Determining where the produced material originates can be difficult. Identifying, for example, intervals where water is primarily produced as opposed to oil can be difficult.

DETAILED DESCRIPTION

Figure 1:
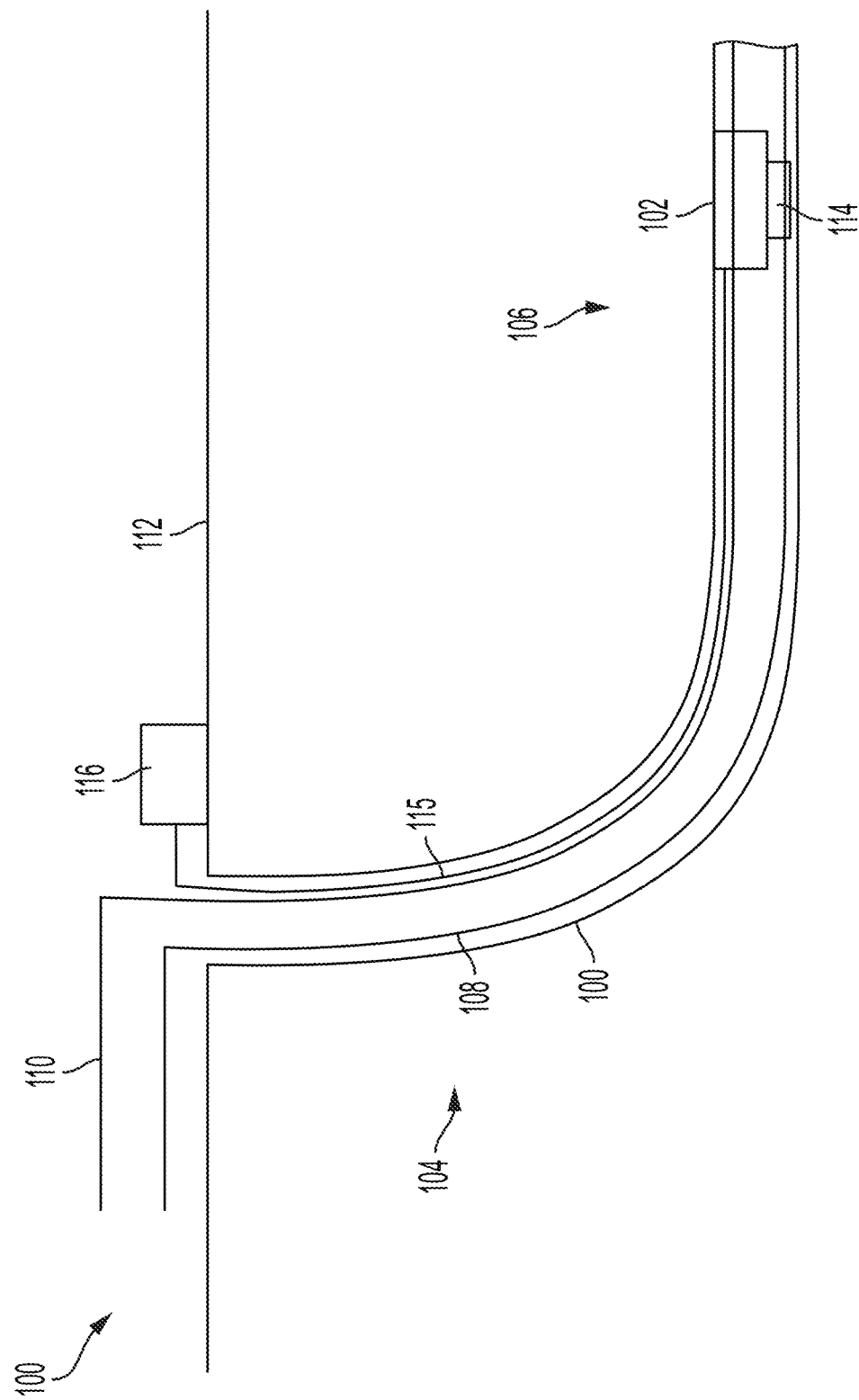
FIG. 1 is a schematic view of a wellbore that includes a multi-phase flow sensor for determining multi-phase measurements of fluid from the wellbore according to one example of the present disclosure.

Certain aspects and examples of the present disclosure relate to a multi-phase flow sensor with a set of variable frequency acoustic emitters spaced apart for making multi-phase fluid measurements of fluid from a wellbore. The fluid from the wellbore may include multi-phase fluid that includes one or more of water, oil, gas, and the like. The wellbore may include a horizontal wellbore or a wellbore with a substantially horizontal section. In some examples, the multi-phase flow sensor can be or otherwise include a sensing transducer or other suitable device that can make, detect, or receive multi-phase measurements. The set of acoustic emitters can include one, two, three, four, or more acoustic emitters for making the multi-phase measurements. The set of acoustic emitters can include one or more fluidic oscillators, hole-tone whistles, other suitable variable-frequency acoustic emitters, or any suitable combination thereof that can receive flowing fluid and generate or propagate acoustic signals. The acoustic emitters, for example fluidic oscillators, may be symmetric or asymmetric.

The set of acoustic emitters may be positioned spaced apart with respect to the multi-phase flow sensor. For example, the set of acoustic emitters may be positioned on or near a circumference of the multi-phase flow sensor or other suitable locations with respect to the multi-phase flow sensor. In some examples, the acoustic emitters can be positioned vertically spaced apart in the flow sensor for measuring different phases of the fluid based on gravitation separation of the fluid. The set of acoustic emitters can be arranged with respect to the multi-phase flow sensor for making measurements relating to one or more phases of the fluid. For example, the multi-phase flow sensor can be positioned in a horizontal section of the wellbore, a first acoustic emitter can be positioned in a first location on the multi-phase flow sensor, and a second acoustic emitter can be positioned in a second location on the multi-phase flow sensor. The first location may be at a top portion of the multi-phase flow sensor to make measurements for a gas phase of the fluid, and the second location may be at a bottom portion of the multi-phase flow sensor to make measurements for a water or oil phase of the fluid, etc.

The wellbore can be formed in a subterranean formation, a sub-oceanic formation, and the like. The wellbore can be used to extract various fluid from the formation. For example, the various fluid can include oil, water, gas, other suitable material, or a combination thereof. The fluid extracted can include one or more phases. In one such example, the fluid can include oil or other suitable single-phase fluid, and in other examples, the fluid can include oil, an oil-water combination phase, gas, other suitable phases for a multi-phase fluid, or any suitable combination thereof. Measuring the multi-phase fluid, such as determining a flow rate or other suitable flow characteristics, such as viscosity, etc., of each different phase of the multi-phase fluid, can be difficult. Other flow sensors may measure the flow rate or other fluid characteristics for the fluid as-a-whole and are not able to distinguish between phases of the multi-phase fluid.

In some examples, horizontal wellbores, or wellbores with a substantially horizontal section, can include multi-phase fluid flow that may be slower than other wellbores. Multi-phase fluid that flows slower than other fluid may not convert an amount of kinetic energy to acoustic or mechanical energy such that the acoustic or mechanical energy can be detected, for example, on a nearby or remote sensing device such as an optical fiber. The multi-phase flow sensor can increase an efficiency of converting kinetic energy of the flowing multi-phase fluid to generated mechanical disturbances, acoustic signals, etc. Additionally, the multi-phase flow sensor can generate acoustic signals or other suitable mechanical disturbances that correlate to phase-specific flow rate and other suitable fluid-flow characteristic information of the multi-phase fluid.

A multi-phase flow sensor that includes a set of acoustic emitters can make multi-phase measurements of fluid flowing in the wellbore. The set of acoustic emitters can include one or more acoustic emitters that, in response to fluid flowing through respective acoustic emitters, generate mechanical disturbances that can cause acoustic signals to be generated and propagated from the multi-phase flow sensor. The generated acoustic signals can include a frequency that is a function of flow rate and fluid type. For example, a first acoustic emitter positioned in the first location with respect to the multi-phase flow sensor can generate a first set of acoustic signals with a first frequency corresponding to the gas phase of the fluid, etc. In some examples, the multi-phase flow sensor can be included in a set of two or more multi-phase flow sensors positioned in a substantially horizontal section of the wellbore. The multi-phase flow sensors of the set of two or more multi-phase flow sensors may be spaced apart to facilitate multi-phase measurements of the fluid flowing in the wellbore. In some examples, acoustic signals generated or propagated by the multi-phase flow sensor can be transmitted to, or otherwise received by, a computing device that can use a machine-learning model or other suitable software to interpret the acoustic signals for determining phase-specific flow rate and fluid flow characteristics.

In some examples, the acoustic emitters may correspond to a number of phases included in or otherwise expected to be included in the multi-phase fluid flowing in the wellbore. For example, if the multi-phase fluid includes or is expected to include three phases, such as oil, water, and gas, etc., the flow sensor can include three spaced apart acoustic emitters each positioned for generating acoustic signals corresponding to the different phases. In other examples, the number of acoustic emitters may not be in one-to-one correspondence with the number of phases of the multi-phase fluid. For example, if the multi-phase fluid includes or is expected to include three phases, such as oil, water, and gas, etc., the flow sensor can include fewer than three or more than three acoustic emitters for generating the acoustic signals to resolve the multi-phase measurements of the multi-phase fluid.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic view of a wellbore 100 that includes a multi-phase flow sensor 102 for determining multi-phase measurements of fluid from the wellbore 100 according to one example of the present disclosure. The wellbore 100 can be disposed in a subterranean formation 104 or other suitable type of formation. The wellbore 100 can include a substantially horizontal section 106, and the multi-phase flow sensor 102 can be disposed or otherwise positioned in the horizontal section 106 of the wellbore 100. In some examples, the multi-phase flow sensor 102 can be positioned in other suitable locations with respect to the wellbore 100. A casing 108, or other suitable component of the wellbore 100 such as a tubing string and the like, can be disposed or otherwise positioned in the wellbore 100 for extracting fluid, such as multi-phase fluid, from the subterranean formation 104 via the wellbore 100. The casing 108 can be coupled to a surface flow line 110 at the surface 112 of the wellbore 100. The wellbore 100 can include any additional or other suitable components for extracting multi-phase fluid from the subterranean formation 104. The multi-phase fluid can include one or more phases of fluid from the wellbore 100. For example, the multi-phase fluid may include oil, water, gas, other suitable wellbore fluid, or any suitable combination thereof.

The multi-phase flow sensor 102 can be disposed in the horizontal section 106 of the wellbore 100. For example, the multi-phase flow sensor 102 can be positioned in or otherwise affixed to the casing 108 or other fluid-carrying component of the wellbore 100 for directing fluid into or through the multi-phase flow sensor 102. The multi-phase flow sensor 102 can receive the fluid from the wellbore 100 or the subterranean formation 104 and can generate acoustic signals or other suitable mechanical disturbances. In some examples, the flow sensor 102 can generate the acoustic signals using one or more acoustic emitters. The acoustic emitters can include a symmetric fluidic oscillator, an asymmetric fluidic oscillator, a hole-tone whistle, other suitable variable frequency acoustic emitters, or any suitable combination thereof. As illustrated in FIG. 1, the multi-phase flow sensor 102 includes one acoustic emitter 114, but the multi-phase flow sensor 102 can include any other suitable number, such as two or more, of acoustic emitters 114 for generating the acoustic signals.

The acoustic emitters 114 can be positioned spaced apart in the multi-phase flow sensor 102. For example, the acoustic emitters 114 can be positioned spaced apart and on or near a circumference of the multi-phase flow sensor 102. Additionally or alternatively, the acoustic emitters 114 can be positioned vertically spaced apart in the multi-phase flow sensor 102. The acoustic emitters 114 can be positioned in the multi-phase flow sensor 102 in any other suitable arrangement for determining multi-phase measurements of the multi-phase fluid.

The multi-phase flow sensor 102 may generate, for example via the acoustic emitter 114, and propagate the acoustic signals in the wellbore 100, in the subterranean formation 104, in other suitable directions, or a combination thereof. The acoustic signals can be detected by a sensing device 115. The sensing device 115 can include a fiber-optic cable, a fiber-optic sensor, an electrical sensor, other suitable sensing devices that can detect acoustic signals, or any suitable combination thereof. The sensing device 115 can be communicatively coupled to a computing device 116, and the sensing device 115 can transmit the acoustic signals to, or convert the acoustic signals to optical signals or electrical signals and transmit the converted signals to, the computing device 116. In some examples, the sensing device 115 can convert the signals into a flow rate for determining multi-phase measurements of the multi-phase fluid. Additionally, the sensing device 115 can include or otherwise be included in a distributed acoustic sensing (DAS) system or other suitable system that can be used to detect the acoustic signals.

In some examples, the acoustic signals generated by the acoustic emitters 114 can be a function of flow characteristics of the multi-phase fluid. For example, a first acoustic emitter can be positioned to measure a first phase, such as oil, water, gas, or combination phases, of the multi-phase fluid. The first acoustic emitter can generate acoustic signals that correspond to the first phase of the multi-phase fluid. For example, the frequency of the acoustic signals generated by the first acoustic emitter can indicate a flow rate, a viscosity, and the like relating to the first phase of the multi-phase fluid.

The computing device 116 can be positioned at the surface 112 of, or in other suitable locations with respect to, the wellbore 100. The computing device 116 can receive the acoustic signals or converted signals from the sensing device 115 and can determine multi-phase measurements relating to multi-phase fluid flowing through the multi-phase flow sensor 102. For example, the computing device 116 can receive the acoustic signals or converted signals and can determine a phase-specific flow rate, phase-specific viscosities, other suitable phase-specific information, or any suitable combination thereof for the multi-phase fluid. The multi-phase measurement can be used to control a wellbore operation. For example, the multi-phase measurement can be used to make decisions about or otherwise control a wellbore exploration operation, a wellbore drilling operation, a wellbore completion operation, a wellbore stimulation operation, a wellbore production operation, other suitable wellbore operations, or any suitable combination thereof.

Figure 2:
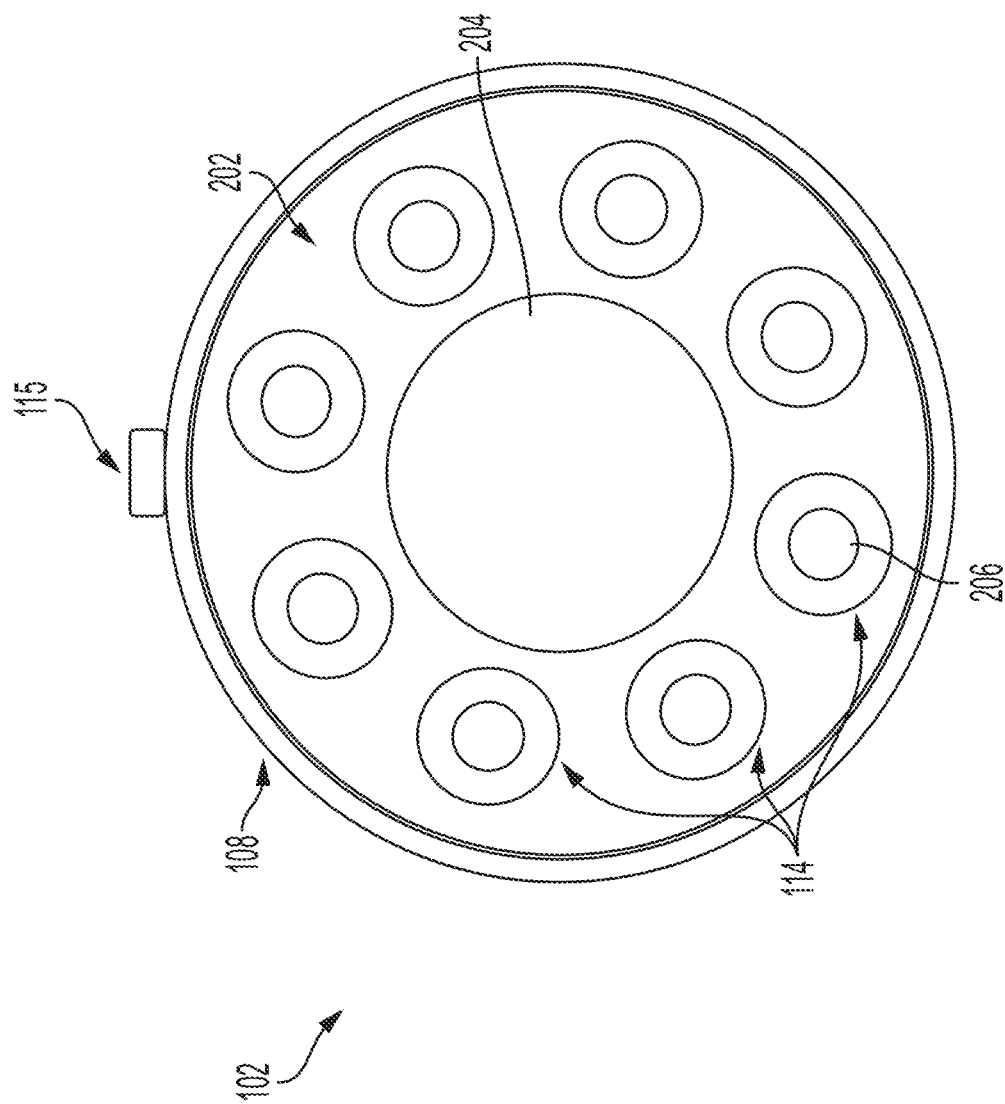
FIG. 2 is a sectional view of a multi-phase flow sensor according to one example of the present disclosure.

FIG. 2 is a sectional view of a multi-phase flow sensor 102 according to one example of the present disclosure. The multi-phase flow sensor 102 can include components, such as the components described below, that can be formed or otherwise disposed in a housing 202 that may be disposed in the wellbore 100 or the casing 108 of the wellbore. In some examples, the housing 202 can include an open central bore 204 that may provide relatively unrestricted fluid flow. The multi-phase flow sensor 102 can include a set of spaced-apart acoustic emitters 114, which can be disposed within the housing 202 around the cross section of the wellbore 100 or casing 108. Each of the acoustic emitters 114 can include an orifice 206 through which fluid can enter and generate acoustic signals or other suitable mechanical disturbances within the orifice 206. The number of and azimuthal distribution of the acoustic emitters 114 may be chosen such that adequate spatial sampling of heterogeneously distributed multi-phase flow is ensured. The acoustic emitters 114 may produce acoustic signals or other suitable mechanical disturbances that can be a function of the phase-specific flow rate and the phase composition of the fluid flowing through the respective acoustic emitters 114. The design of the various acoustic emitters 114 can vary between different multi-phase flow sensors 102 and may be individually optimized depending on the application, for example to measure fluid injection as opposed to fluid production, etc. To measure multi-phase flow in a highly inclined or horizontal well, two or more acoustic emitters 114 can be included in the multi-phase flow sensor at a different vertical locations.

As illustrated, a plurality of acoustic emitters 114, such as fluidic oscillators or hole-tone whistles, can be disposed in a separate housing 202 in which an exterior of the housing 202 can be shaped to fit within the casing 108. In some examples, the acoustic emitters 114 may be made from the same or similar material as the housing 202. In some examples, the acoustic emitters 114 and the housing 202 may be made from different materials. In some examples, the acoustic emitters 114 may be integrally formed with the housing 202 such as by machining, casting, or molding.

The housing 202, the acoustic emitters 114, or a combination thereof may be made from a soluble or otherwise dissolvable material that can be readily removed from the casing 108 or wellbore 100 by pumping a suitable solution into the wellbore 100. For example, the housing 202 can include a filler material that includes dissolvable material, and the acoustic emitters 114 can be positioned in the filler material of the housing 202. In some examples, the housing 202, the acoustic emitters 114, or a combination thereof may be made from a material that can be readily removed from the wellbore 100 or the casing 108 by milling.

The flow sensor 102, or sensing transducer, can be deployed in a wellbore 100 using any suitable conveyance technique such as via an armored electrical cable (wireline), a slickline, a well tractor (e.g., autonomous robotic tractor), coiled tubing or jointed tubing, etc. The flow sensor 102 can include or otherwise be made of any suitable material that can withstand ambient wellbore conditions such as high pressure, fluid composition in the wellbore 100, and temperature, etc. In some examples, the flow sensor 102 may include or otherwise be made of materials similar to materials used for dissolvable well plugs, and the like. Such materials can include, for example, aluminum, which may be dissolved by pumping a caustic solution into the well, etc. A sensing device 115, such as a DAS system implemented as one or more optical fibers, may be disposed on the exterior of the casing 108 to detect signals generated by the flow sensor 102 in response to fluid flow in the casing 108. Flow restrictions caused by the flow sensor 102 may be removed in response to dissolving the flow sensor 102 such as when soluble material is used for the flow sensor 102.

Two or more flow sensors 102 can be spaced apart longitudinally along locations of the wellbore 100 for providing or determining flow rates, which can be measured at such spaced apart locations, and a flow profile along the wellbore 100 may be determined. The flow profile can indicate a given, axial interval of wellbore segment's contribution to the total production or injection of the wellbore 100. Deploying the flow sensors 102 at longitudinally spaced apart locations along the wellbore 100 may provide a way to measure flow rates along the wellbore 100 to identify high productivity or marginally productive axial intervals along the wellbore 100. Accordingly, appropriate measures can be taken to improve a production operation.

In some examples, one or more flow sensors 102, as illustrated in FIG. 2, may be deployed in the wellbore 100 using any suitable conveyance technique such as those above, and measurements of fluid flow in the wellbore 100 may be made using the sensing device 115 such as a DAS or other suitable sensing device. Signals generated by one or more of the flow sensors 102 may be detected, analyzed, and recorded, etc. In some examples, the flow sensors 102 may be removed from the wellbore 100 after the measurements are made. The flow sensors 102 can be removed by retrieval using any suitable conveyance technique or, for example, by dissolving the flow sensors 102. In some examples, the flow sensors 102 may be retained in the wellbore 100 for subsequent measurements of fluid flow in the wellbore 100.

Figure 3:
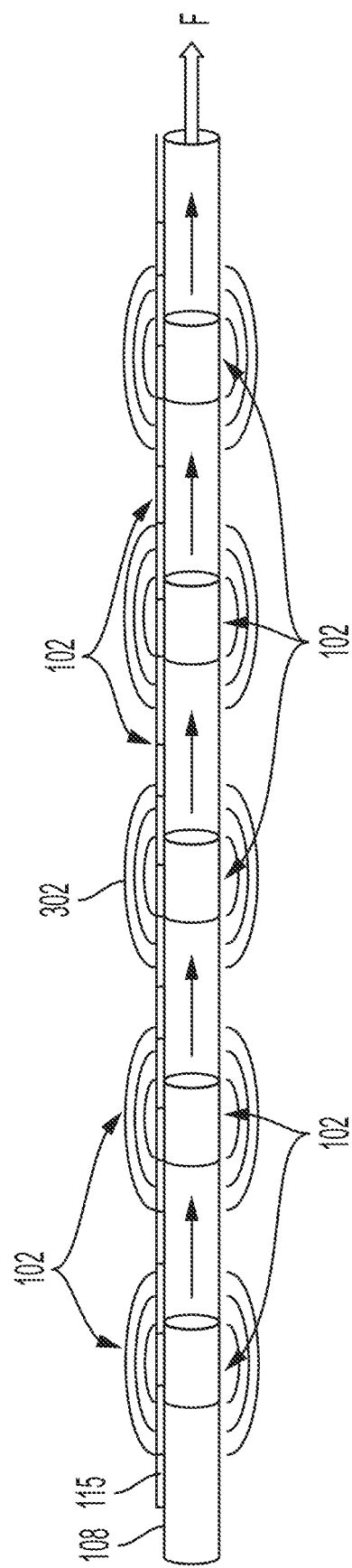
FIG. 3 is a schematic view of a set of multi-phase flow sensors spaced apart in a horizontal wellbore according to one example of the present disclosure.

FIG. 3 is a schematic view of a set of multi-phase flow sensors 102 spaced apart in a horizontal section 106 of a wellbore 100 according to one example of the present disclosure. FIG. 3 illustrates the longitudinally spaced apart flow sensors 102 along a horizontal section 106 of the wellbore 100. Each flow sensor 102 may emit signals 302, such as acoustic signals, in response to fluid flow F that may be detected by the sensing device 115, such as a distributed sensor, disposed outside the casing 108.

The response of the acoustic emitters 114 of the flow sensor 102 can be a function of flow velocities and material properties, such as compressibility, surface tension, density and viscosity, of the flowing fluid. Thus, the transducing component response can be used to estimate phase-specific flow rate and fluid phase ratios. In some examples, a machine-learning approach can be used to estimate flow rate and phase ratio from flow sensor response. One possible machine-learning technique can involve training a neural network or other suitable machine-learning model with device responses obtained from flow-loop experiments or appropriate numerical modeling.

For a given flow sensor design, the training data set may include the measured response for a variety of surface tensions, densities, and viscosities, etc. Such variety of compressibility, surface tension, densities, and viscosities may provide training data for various fluid compositions and flow rates at various reservoir conditions such as different temperatures and pressures. For example, if the flow sensor design includes seven circumferentially spaced apart acoustic emitters 114, which may produce seven independent signals, and an objective involves solving for the flow rates of three fluid phases, then a training approach may involve a neural network consisting of an input layer with seven nodes, an output layer with three nodes, and at least one hidden layer between the input layer and the output layer. The number of hidden layers and associated neurons may be established through trial. In some examples, the neural network may include two or more hidden layers. Other network topologies, such as auto-encoders or convolutional neural networks, may be used. The machine-learning model may accept, as input, the training data to determine weights of each neuron in the hidden layer. A portion of the training data set can be used to test the trained machine-learning model. The trained machine-learning model may be saved and used on subsequent data as acquired from existing wellbores. The components of the machine-learning model can include vector-matrix operations and can be applied in real-time.

Figure 4:
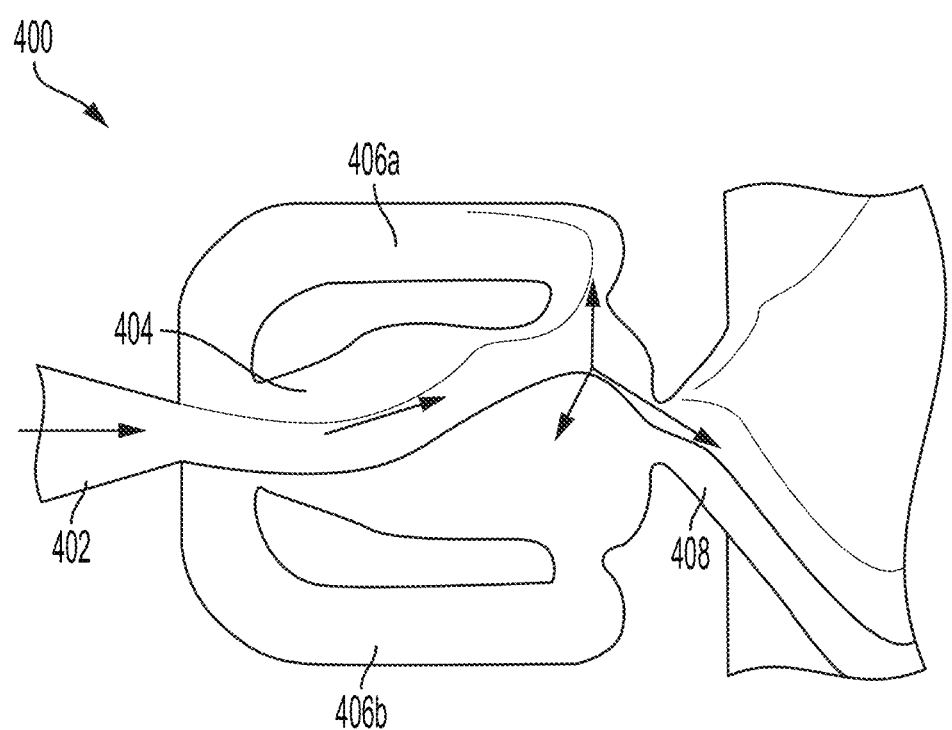
FIG. 4 is a diagram of fluid flow with respect to an acoustic emitter according to one example of the present disclosure.

FIG. 4 is a diagram of fluid flow with respect to an acoustic emitter 400 according to one example of the present disclosure. The acoustic emitter 400 can include a fluidic oscillator or other suitable acoustic emitter and can be included in the multi-phase flow sensor 102. The acoustic emitter 400 can include an inlet channel 402, a mixing chamber 404, feedback loops 406a-b, and an outlet channel 408. The inlet channel 402 may be coupled to the mixing chamber 404, which may be coupled to the feedback loops 406a-b and the outlet channel 408. The acoustic emitter 400 can include other or different suitable components. Additionally, while illustrated as symmetric, the acoustic emitter 400 may be asymmetric or otherwise include an asymmetric feature. For example, the outlet channel 408 or other suitable feature of the acoustic emitter 400 may be asymmetric.

Fluid may be directed into the acoustic emitter 400 via the inlet channel 402. The fluid may travel into the mixing chamber 404, and the fluid may oscillate. For example, the fluid may oscillate in the mixing chamber 404, by traveling through one or more of the feedback loops 406a-b, by flowing through the outlet channel 408, etc. The frequency of oscillation of the fluid may depend on various factors. For example, the frequency of oscillation of the fluid can be a linear function of the flow rate of the fluid. Additionally or alternatively, the frequency of oscillation of the fluid may depend on a pressure drop, such as the square root of the pressure drop, in the acoustic emitter 400. The frequency of oscillation may depend on other suitable factors relating to the acoustic emitter 400. In some examples, the oscillation of the fluid in the acoustic emitter 400 may cause acoustic signals to be generated or propagated.

Figure 5:
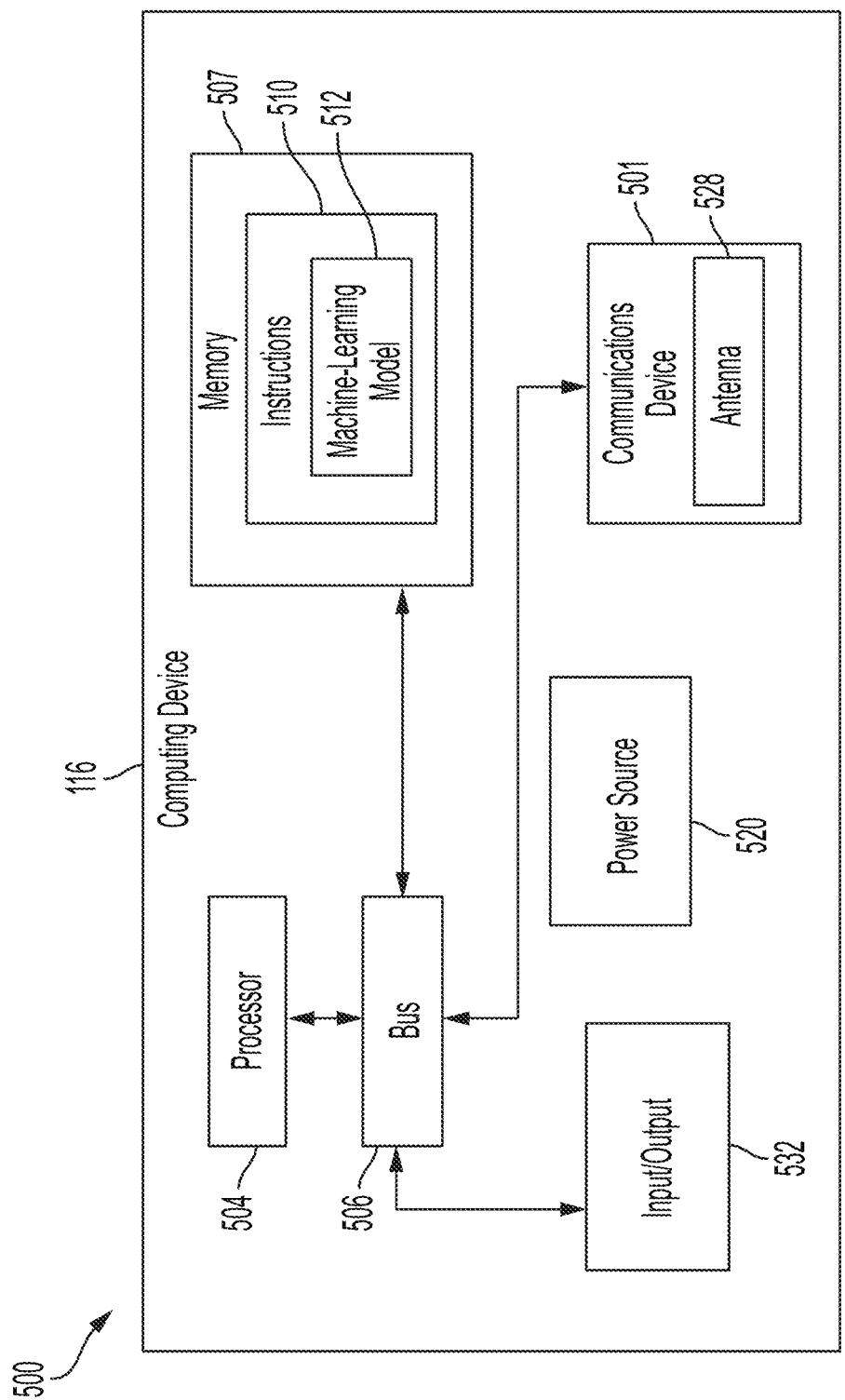
FIG. 5 is a block diagram of a computing system for determining multi-phase fluid measurements using one or more multi-phase flow sensors and machine-learning according to one example of the present disclosure.

FIG. 5 is a block diagram of a computing system 500 for determining multi-phase fluid measurements using one or more multi-phase flow sensors 102 and machine-learning according to one example of the present disclosure. The components shown in FIG. 5, such as the processor 504, memory 507, power source 520, and communications device 501, etc., may be integrated into a single structure, such as within a single housing of a computing device 116. Alternatively, the components shown in FIG. 5 can be distributed from one another and in electrical communication with each other.

The computing system 500 may include the computing device 116. The computing device 116 can include the processor 504, the memory 507 (e.g., non-volatile), and a bus 506. The processor 504 can execute one or more operations for interpreting acoustic signals and determining information, such as fluid type, flow rate, phase ratios, etc., relating to multi-phase fluid flowing in, or from, the wellbore 100. The processor 504 can execute instructions stored in the memory 507 to perform the operations. The processor 504 can include one processing device or multiple processing devices or cores. Non-limiting examples of the processor 504 include a Field-Programmable Gate Array ("FPGA"), an application-specific integrated circuit ("ASIC"), a microprocessor, etc.

The processor 504 can be communicatively coupled to the memory 507 via the bus 506. The memory 507 may include any type of memory device that retains stored information when powered off. Non-limiting examples of the memory 507 may include EEPROM, flash memory, or any other type of non-volatile memory. In some examples, at least part of the memory 507 can include a medium from which the processor 504 can read the instructions. A computer-readable medium can include electronic, optical, magnetic, or other storage devices capable of providing the processor 504 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, Java, Perl, Python, etc.

In some examples, the memory 507 can include computer program instructions 510 for generating, training, and applying a machine-learning model 512. For example, the computer program instructions 510 can include the machine-learning model 512 that is executable by the processor 504 for causing the processor 504 to determine, based on acoustic signals generated by the acoustic emitters 114, multi-phase measurements for fluid flowing with respect to the wellbore 100. The machine-learning model 512 can be trained using historical flow data, such as data from a reference wellbore, synthetic data, or a combination thereof. For example, the computing device 116 can receive data indicating historical flow from a reference wellbore. Additionally, the computing device 116 can generate synthetic data by generating, instead of measuring, varying types of data relating to multi-phase fluid flow. The computing device 116 can generate training data using the historical flow data and the synthetic data, and the computing device 116 can use the training data to train the machine-learning model 512 to interpret acoustic signals from or otherwise received with respect to the wellbore 100. For example, the trained machine-learning model 512 can be applied to the acoustic signals and converted flow rate data to determine multi-phase measurements, such as phase-specific flow rate, ratio of phases, type of fluid, flow characteristics, etc., for the multi-phase fluid.

The computing device can include a power source 520. The power source 520 can be in electrical communication with the computing device 116 and the communications device 501. In some examples, the power source 520 can include a battery or an electrical cable such as a wireline. The power source 520 can include an AC signal generator. The computing device 116 can operate the power source 520 to apply a transmission signal to an antenna 528 to generate electromagnetic waves that convey data relating to the acoustic signals, the multi-phase measurements, one or more acoustic emitters 114, etc. to other systems. For example, the computing device 116 can cause the power source 520 to apply a voltage with a frequency within a specific frequency range to the antenna 528. This can cause the antenna 528 to generate a wireless transmission. In other examples, the computing device 116, rather than the power source 520, can apply the transmission signal to the antenna 528 for generating the wireless transmission.

In some examples, part of the communications device 501 can be implemented in software. For example, the communications device 501 can include additional instructions stored in memory 507 for controlling functions of the communications device 501. The communications device 501 can receive signals from remote devices and transmit data to remote devices. For example, the communications device 501 can transmit wireless communications that are modulated by data via the antenna 528. In some examples, the communications device 501 can receive signals, which may be associated with data to be transmitted, from the processor 504 and amplify, filter, modulate, frequency shift, or otherwise manipulate the signals. In some examples, the communications device 501 can transmit the manipulated signals to the antenna 528. The antenna 528 can receive the manipulated signals and responsively generate wireless communications that carry the data.

The computing device 116 can additionally include an input/output interface 532. The input/output interface 532 can connect to a keyboard, pointing device, display, and other computer input/output devices. An operator may provide input using the input/output interface 532. Data relating to the flow sensor 102 and fluid flow can be displayed to an operator of the wellbore 100 through a display that is connected to or is part of the input/output interface 532. Displayed values can be observed by the operator, or by a supervisor of the wellbore 100, who can make adjustments to wellbore operations based on the displayed values. Additionally or alternatively, the computing device 116 can automatically control or adjust wellbore operations based on the multi-phase measurements made using the acoustic signals from the acoustic emitters 114.

Figure 6:
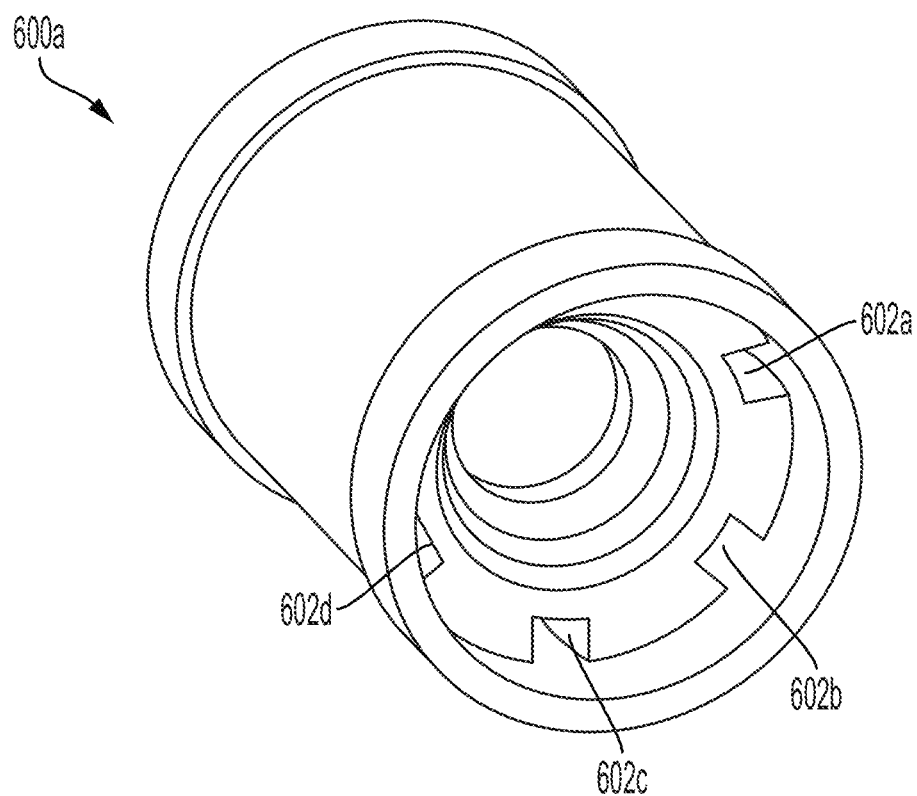
FIG. 6 is a perspective view of two examples of multi-phase flow sensors having one or more pairs of matching acoustic devices according to one example of the present disclosure.
Figure 6:
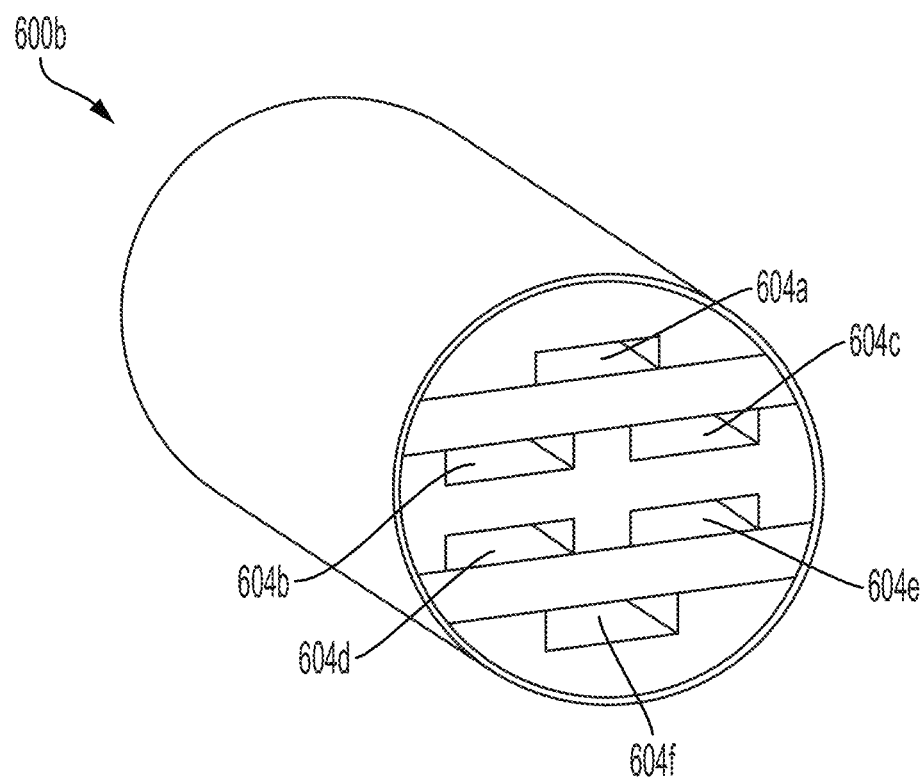

FIG. 6 is a perspective view of two examples of multi-phase flow sensors 600a-b having one or more pairs of matching acoustic emitters 114 according to one example of the present disclosure. As illustrated, the multi-phase flow sensors 600a-b each include six acoustic emitters 114. The acoustic emitters 114 may be arranged circumferentially (e.g., on a circumference) with respect to the multi-phase flow meter 600a, and the acoustic emitters 114 may be arranged in a stacked arrangement with respect to the multi-phase flow sensor 600b. The multi-phase flow sensors 600a-b can each include six flow channels for directing flowing fluid to respective acoustic emitters 114. Four of the flow channels 602a-d of the multi-phase flow meter 600a are illustrated, and the flow channels 604a-f of the multi-phase flow sensor 600b are illustrated.

In some examples, one or more of the acoustic emitters 114 may be matching. For example, the multi-phase flow sensor 600b can include three pairs of matching acoustic emitters 114. As illustrated, a first matching pair may correspond to acoustic emitters 114 of the flow channels 604a-b, a second matching pair may correspond to acoustic emitters 114 of the flow channels 604e-f, and a third matching pair may correspond to the flow channels 604c-d. Other suitable matching pairs, including different numbers of matching pairs, and the like, are possible. A matching pair of acoustic emitters 114 may indicate that the respective acoustic emitters are of the same design, size, and frequency response with respect to fluid flow. For example, a similar fluid flowing through a matching pair of acoustic emitters 114 would yield the same or essentially the same signal response. Accordingly, a similarity (or a difference between) fluids flowing through the matching pairs of acoustic emitters can be resolved or otherwise determined. For example, if two different signals are received at two matching acoustic emitters 114, respectively, then the fluid flowing through a first of the matching acoustic emitters 114 may be different than the fluid flowing through the second of the matching acoustic emitters 114. A degree of difference in the acoustic signals between the matching pair of acoustic emitters 114 can be used to resolve the degree of difference between the two different types of fluid flowing through the matching acoustic emitters 114. For example, the degree of difference can involve determining whether a fluid density, a fluid viscosity, or other characteristics of the two fluids are different.

Figure 7:
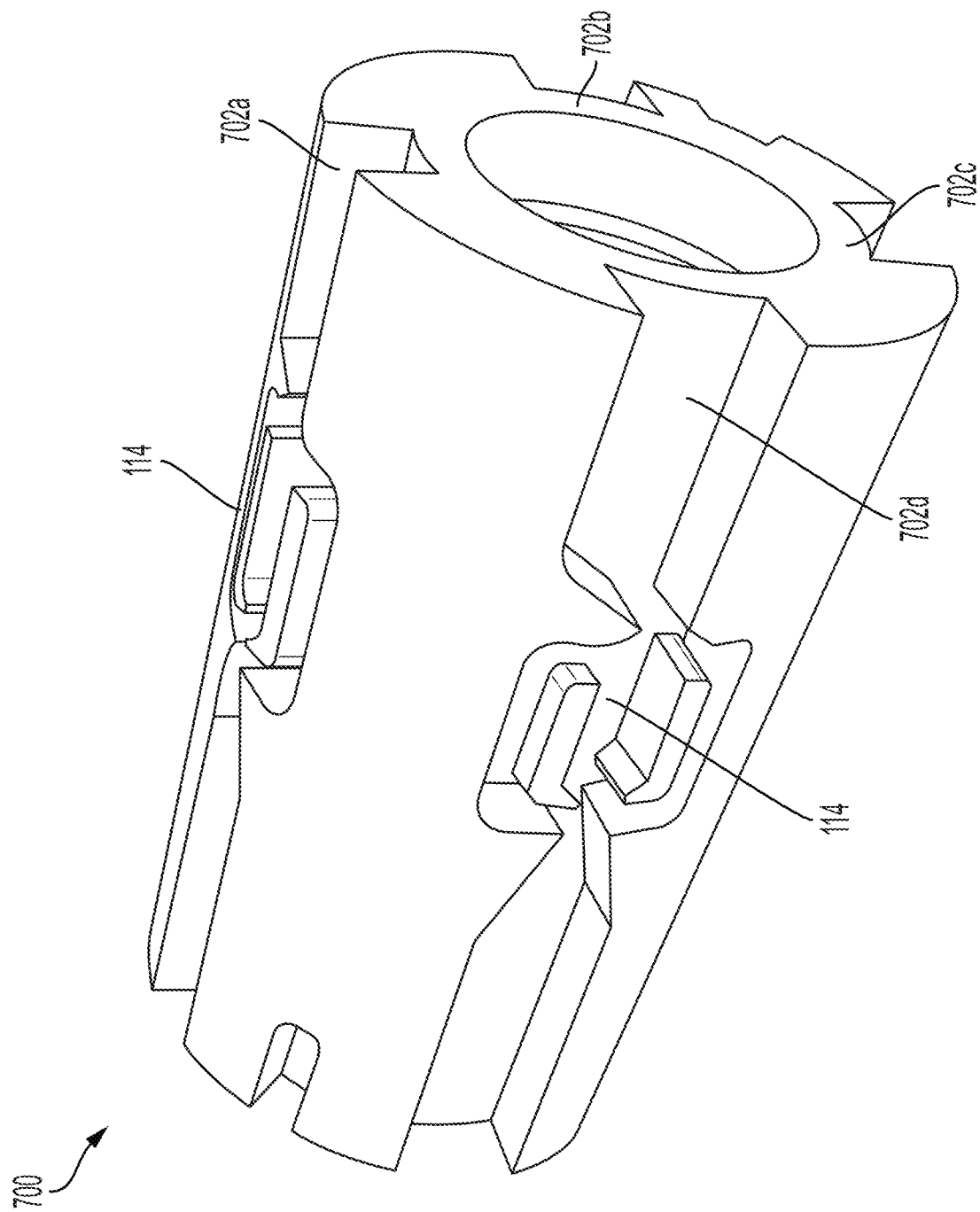
FIG. 7 is a perspective view of an example of a multi-phase flow sensor with exterior acoustic devices according to one example of the present disclosure.

FIG. 7 is a perspective view of an example of a multi-phase flow sensor 700 with exterior acoustic emitters 114 according to one example of the present disclosure. The multi-phase flow sensor 700 can include four flow channels 702a-d, which may each direct flowing fluid to a respective acoustic emitter 114 of the multi-phase flow sensor 700. Other suitable numbers (e.g., less than four or more than four) of flow channels can be included in the multi-phase flow sensor 700. The flow channels 702a-d can be positioned on an exterior of the multi-phase flow sensor 700. For example, the flow channels 702a-d can cause fluid flowing in the wellbore to flow between the multi-phase flow sensor 700 and a conduit or tubular of the wellbore.

Figure 8:
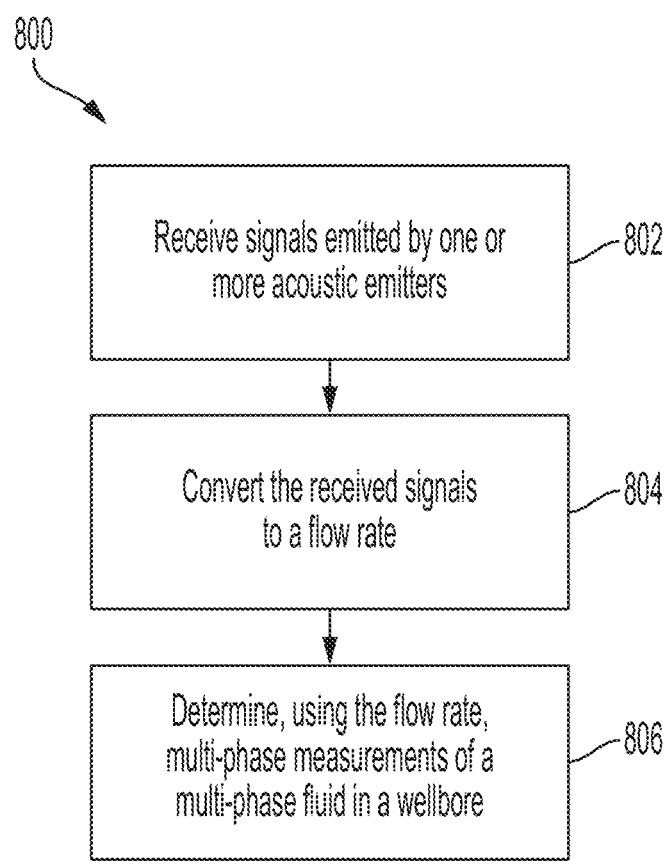
FIG. 8 is a flowchart of a process for determining multi-phase measurements of fluid in a wellbore according to one example of the present disclosure.

FIG. 8 is a flowchart of a process 800 for determining multi-phase measurements of fluid in a wellbore 100 according to one example of the present disclosure. At block 802, signals emitted from one or more variable frequency acoustic emitters 114 are received. The signals can include acoustic signals or other suitable mechanical signals generated by flowing fluid through the acoustic emitters 114. The acoustic emitters 114 may be positioned spaced apart in the flow sensor 102 or other suitable sensing transducer for generating the acoustic signals. For example, the acoustic emitters 114 can be positioned on a circumference of the flow sensor 102, vertically spaced apart in the flow sensor 102, or in other suitable arrangements for generating the acoustic signals. In some examples, the acoustic emitters 114 can be positioned on a circumference of or vertically spaced apart in a conduit, such as the casing 108, of the wellbore 100.

In some examples, the acoustic signals may correspond to different phases of multi-phase fluid in the wellbore 100. For example, the acoustic signals can each include different frequencies or frequency ranges that indicate a different phase of the multi-phase fluid. The acoustic signals can be received by the computing device 116. In some examples, the acoustic signals can be detected by the sensing device 115, such as a DAS system, and the sensing device 115 can propagate the acoustic signals, or converted signals thereof, to the computing device 116. The converted signals can include optical signals, electrical signals, etc.

At block 804, the received signals are converted to flow rate data. In some examples, the computing device 116, or other suitable device such as the sensing device 115, can convert the received signals to the flow rate data. The computing device 116, or other suitable device, can receive the acoustic signals and can convert the acoustic signals to the flow rate data. In some examples, the flow rate data can include data about the multi-phase fluid flowing in the wellbore 100.

At block 806, multi-phase measurements of a multi-phase fluid flowing in the wellbore 100 are determined based on the converted flow rate data. In some examples, the computing device 116 or other suitable device can determine the multi-phase measurements of the multi-phase fluid using the converted flow rate data. The converted flow rate data may indicate different data about different phases of the multi-phase fluid. For example, a first subset of the flow rate data may indicate information about a first phase of the multi-phase fluid, and a second subset of the flow rate data may indicate information about a second phase of the multi-phase fluid.

The flow rate data can be used to determine the multi-phase measurements, which may include flow characteristics relating to the multi-phase fluid flowing in the wellbore 100. In some examples, the flow characteristics may include phase-specific information. For example, the flow characteristics can include a phase-specific flow rate, a phase-specific viscosity, phase-specific ratios, and other suitable phase-specific information. The phase-specific flow rate may indicate a flow rate of one of the phases of the multi-phase fluid, the phase-specific viscosity may indicate a viscosity of one of the phases of the multi-phase fluid, and the phase-specific ratio may indicate a ratio of one of the phases of the multi-phase fluid compared to the other phases, etc. The flow characteristics can include any other suitable information relating to the multi-phase fluid and multi-phase measurements.

In some examples, the computing device 116 can execute one or more software modules to determine the multi-phase measurements. The software modules can include engineering models, physics-based models, machine-learning models, other suitable software modules, or any suitable combination thereof. In examples in which machine-learning models are used, the computing device 116 may train and apply the machine-learning model to the flow rate data, to the acoustic signals, or to a combination thereof to determine the multi-phase measurements or flow characteristics. For example, the computing device 116 can generate or otherwise receive a training dataset and use the training dataset to train the machine-learning model. The computing device 116 can apply the trained machine-learning model to the flow rate data, to the acoustic signals, or to a combination thereof to determine the multi-phase measurements, the flow characteristics, or a combination thereof.

Figure 9:
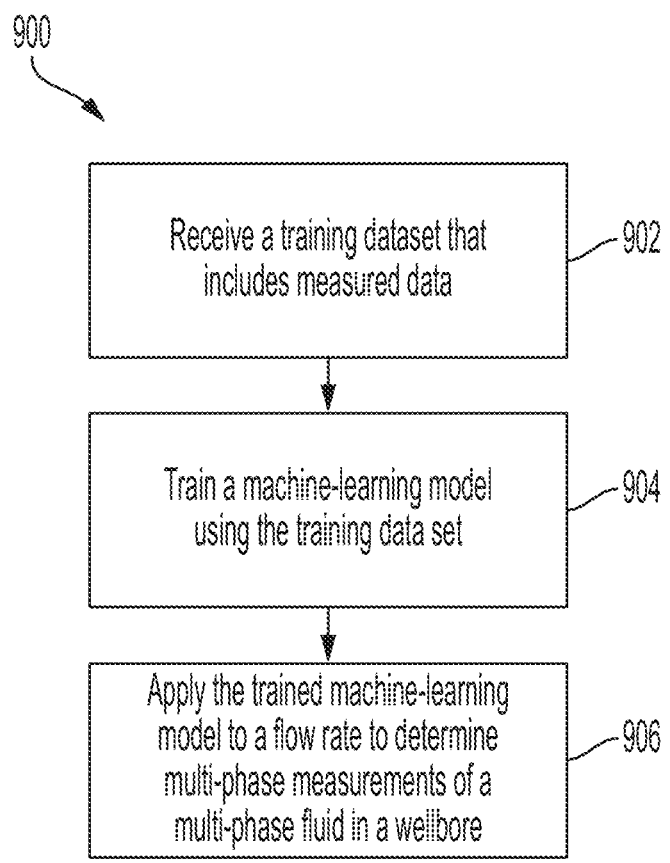
FIG. 9 is a flowchart of a process for training and applying a machine-learning model to determine multi-phase measurements of fluid in a wellbore according to one example of the present disclosure.

FIG. 9 is a flowchart of a process 900 for training and applying a machine-learning model 512 to determine multi-phase measurements of fluid in a wellbore 100 according to one example of the present disclosure. At block 902, a training dataset that includes measured data is received. In some examples, the computing device 116 or other suitable device can receive or otherwise generate the training dataset. For example, the computing device 116 can make measurements or otherwise receive the measured data, and the computing device 116 can compile the measured data into the training dataset. In some examples, the measured data can include measurements relating to multi-phase fluid flow from existing wellbores. For example, the measurements can include phase-specific flow rates, phase-specific viscosities, phase ratios, and other suitable measured data relating to multi-phase fluid flowing in the existing wellbores. Additionally or alternatively, the measured data can include acoustic signals received from acoustic emitters 114 positioned in the existing wellbores. Other suitable measured data can be included in the training dataset.

At block 904, a machine-learning model 512 is trained using the training dataset. The computing device 116 can use the training dataset to train the machine-learning model 512. For example, the computing device 116 can input a subset of the training dataset into the machine-learning model 512 to tune or optimize weights or other parameters included in the machine-learning model 512. The computing device 116 can train the machine-learning model 512 via different numbers of training iterations. For example, the computing device 116 can train the machine-learning model 512 using one, two, three, four, or more iterations of training using one or more subsets of the training data. The trained machine-learning model 512 may receive, as input, the flow rate data, the acoustic signals, or a combination thereof and may be configured to output the multi-phase measurements, the flow characteristics, or a combination thereof.

At block 906, the trained machine-learning model 512 is applied to a flow rate to determine multi-phase measurements of fluid flowing in the wellbore 100. The computing device 116 can apply the trained machine-learning model 512 to the flow rate. In some examples, the computing device 116 can apply the trained machine-learning model 512 to flow rate data, to the acoustic signals, or to a combination thereof. For example, the trained machine-learning model 512 can receive, as input, the flow rate data, the acoustic signals, or a combination thereof. The trained machine-learning model 512 can map, using tuned or otherwise optimized weights based on the training dataset, the input to one or more outputs that may include the multi-phase measurements, flow characteristics, other suitable outputs, or any suitable combination thereof. In some examples, the trained machine-learning model 512 can output flow characteristics that can include a phase-specific flow rate, a phase-specific viscosity, a ratio of phases of the multi-phase fluid, other suitable flow characteristics, or any suitable combination thereof with respect to the multi-phase fluid.

Figure 10:
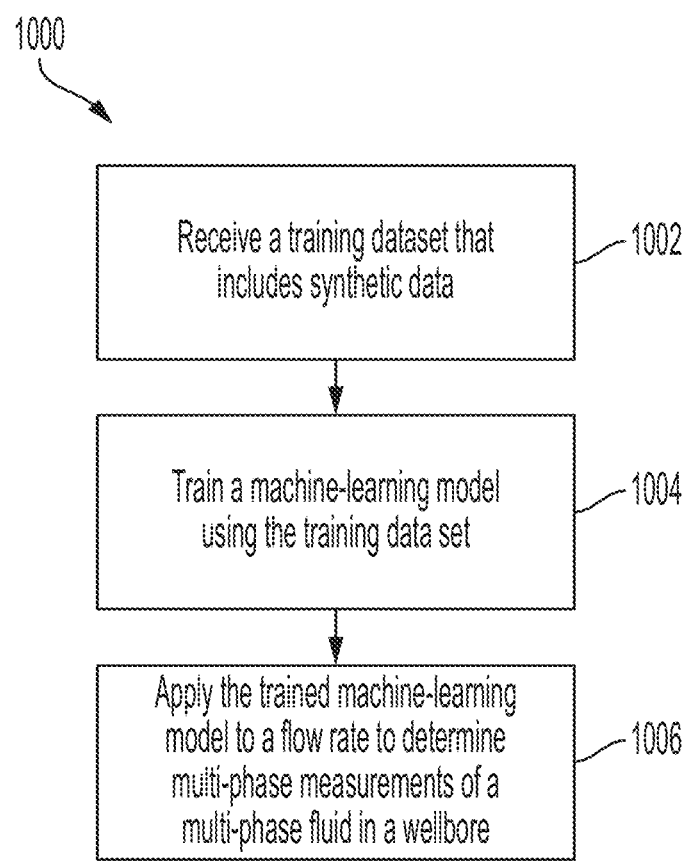
FIG. 10 is a flowchart of a process for training and applying a machine-learning model to determine multi-phase measurements of fluid in a wellbore according to one example of the present disclosure.

FIG. 10 is a flowchart of a process 1000 for training and applying a machine-learning model 512 to determine multi-phase measurements of fluid in a wellbore 100 according to one example of the present disclosure. At block 1002, a training dataset that includes synthetic data is received. In some examples, the computing device 116 or other suitable device can receive or otherwise generate the training dataset. For example, the computing device 116 can generate the synthetic data using one or more suitable models or otherwise receive the synthetic data, and the computing device 116 can compile the synthetic data into the training dataset. In some examples, the synthetic data can include artificial data relating to multi-phase fluid flow from simulated wellbores. For example, the synthetic data can include phase-specific flow rates, phase-specific viscosities, phase ratios, and other suitable synthetic data relating to multi-phase fluid flowing in the existing wellbores. Additionally or alternatively, the synthetic data can include simulated acoustic signals from one or more acoustic emitters 114. Other suitable synthetic data can be included in the training dataset.

At block 1004, a machine-learning model 512 is trained using the training dataset. The computing device 116 can use the training dataset to train the machine-learning model 512. For example, the computing device 116 can input a subset of the training dataset into the machine-learning model 512 to tune or optimize weights or other parameters included in the machine-learning model 512. The computing device 116 can train the machine-learning model 512 via different numbers of training iterations. For example, the computing device 116 can train the machine-learning model 512 using one, two, three, four, or more iterations of training using one or more subsets of the training data. The trained machine-learning model 512 may receive, as input, the flow rate data, the acoustic signals, or a combination thereof and may be configured to output the multi-phase measurements, the flow characteristics, or a combination thereof.

At block 1006, the trained machine-learning model 512 is applied to a flow rate to determine multi-phase measurements of fluid flowing in the wellbore 100. The computing device 116 can apply the trained machine-learning model 512 to the flow rate. In some examples, the computing device 116 can apply the trained machine-learning model 512 to flow rate data, to the acoustic signals, or to a combination thereof. For example, the trained machine-learning model 512 can receive, as input, the flow rate data, the acoustic signals, or a combination thereof. The trained machine-learning model 512 can map, using tuned or otherwise optimized weights based on the training dataset, the input to one or more outputs that may include the multi-phase measurements, flow characteristics, other suitable outputs, or any suitable combination thereof. In some examples, the trained machine-learning model 512 can output flow characteristics that can include a phase-specific flow rate, a phase-specific viscosity, a ratio of phases of the multi-phase fluid, other suitable flow characteristics, or any suitable combination thereof with respect to the multi-phase fluid.

Figure 11:
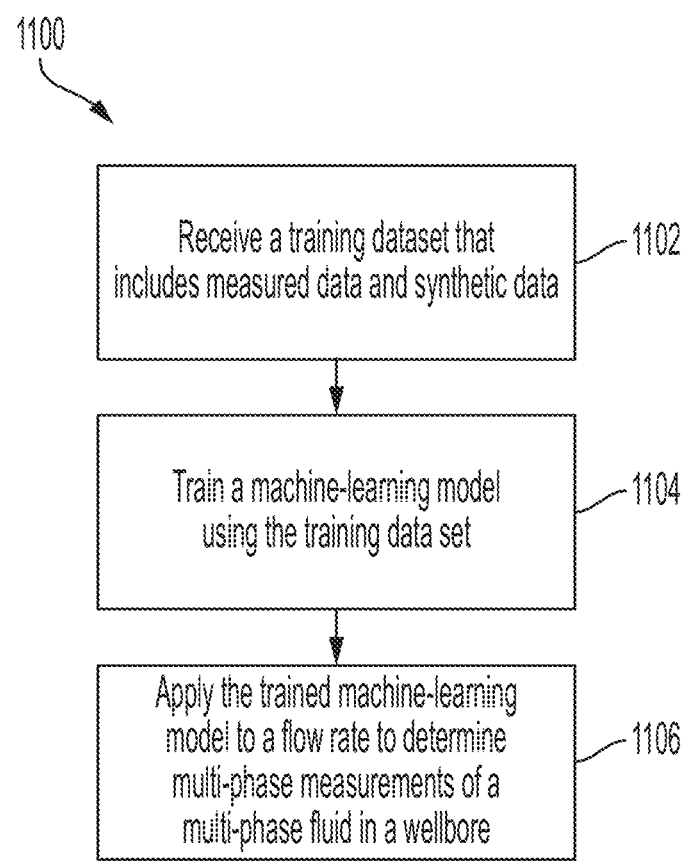
FIG. 11 is a flowchart of a process for training and applying a machine-learning model to determine multi-phase measurements of fluid in a wellbore according to one example of the present disclosure.

FIG. 11 is a flowchart of a process 1100 for training and applying a machine-learning model 512 to determine multi-phase measurements of fluid in a wellbore 100 according to one example of the present disclosure. At block 1102, a training dataset that includes measured data and synthetic is received. In some examples, the computing device 116 or other suitable device can receive or otherwise generate the training dataset. For example, the computing device 116 can make measurements or otherwise receive the measured data, and the computing device 116 can generate or otherwise receive the synthetic data. The computing device 116 can compile the measured data and the synthetic data into the training dataset. In some examples, the measured data can include measurements relating to multi-phase fluid flow from existing wellbores. For example, the measurements can include phase-specific flow rates, phase-specific viscosities, phase ratios, and other suitable measured data relating to multi-phase fluid flowing in the existing wellbores. Additionally or alternatively, the measured data can include acoustic signals received from acoustic emitters 114 positioned in the existing wellbores. In some examples, the synthetic data can include artificial data relating to multi-phase fluid flow from simulated wellbores. For example, the synthetic data can include phase-specific flow rates, phase-specific viscosities, phase ratios, and other suitable synthetic data relating to multi-phase fluid flowing in the existing wellbores. Additionally or alternatively, the synthetic data can include simulated acoustic signals from one or more acoustic emitters 114. Other suitable synthetic or measured data can be included in the training dataset.

At block 1104, a machine-learning model 512 is trained using the training dataset. The computing device 116 can use the training dataset to train the machine-learning model 512. For example, the computing device 116 can input a subset of the training dataset into the machine-learning model 512 to tune or optimize weights or other parameters included in the machine-learning model 512. The computing device 116 can train the machine-learning model 512 via different numbers of training iterations. For example, the computing device 116 can train the machine-learning model 512 using one, two, three, four, or more iterations of training using one or more subsets of the training data. The trained machine-learning model 512 may receive, as input, the flow rate data, the acoustic signals, or a combination thereof and may be configured to output the multi-phase measurements, the flow characteristics, or a combination thereof.

At block 1106, the trained machine-learning model 512 is applied to a flow rate to determine multi-phase measurements of fluid flowing in the wellbore 100. The computing device 116 can apply the trained machine-learning model 512 to the flow rate. In some examples, the computing device 116 can apply the trained machine-learning model 512 to flow rate data, to the acoustic signals, or to a combination thereof. For example, the trained machine-learning model 512 can receive, as input, the flow rate data, the acoustic signals, or a combination thereof. The trained machine-learning model 512 can map, using tuned or otherwise optimized weights based on the training dataset, the input to one or more outputs that may include the multi-phase measurements, flow characteristics, other suitable outputs, or any suitable combination thereof. In some examples, the trained machine-learning model 512 can output flow characteristics that can include a phase-specific flow rate, a phase-specific viscosity, a ratio of phases of the multi-phase fluid, other suitable flow characteristics, or any suitable combination thereof with respect to the multi-phase fluid.

In some aspects, methods, flow sensors, and systems for monitoring multi-phase fluid flow with respect to a wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: receiving signals emitted by each variable frequency acoustic emitter of a plurality of variable frequency acoustic emitters positioned spaced apart in a sensing transducer that is in an interior of a wellbore; converting the received signals into a flow rate of each of a plurality of different fluid phases of a fluid in the wellbore; and determining, using the flow rate, multi-phase fluid measurements of the fluid.

Example 2 is the method of example 1, wherein variable frequency acoustic emitters of the plurality of variable frequency acoustic emitters are positioned circumferentially spaced apart in the sensing transducer, and wherein each variable frequency acoustic emitter is positioned in the sensing transducer for generating acoustic signals corresponding to a different phase of the fluid in the wellbore.

Example 3 is the method of example 1, wherein variable frequency acoustic emitters of the plurality of variable frequency acoustic emitters are positioned vertically spaced apart in the sensing transducer, and wherein each variable frequency acoustic emitter is positioned in the sensing transducer for generating acoustic signals corresponding to a different phase of the fluid in the wellbore.

Example 4 is the method of example 1, further comprising: training, using a training dataset, a machine-learning model to determine the multi-phase measurements of the fluid; and applying the trained machine-learning model to the flow rate to determine the multi-phase measurements of the fluid.

Example 5 is the method of any of examples 1 and 4, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data.

Example 6 is the method of example 1, wherein the received signals comprise a plurality of different acoustic signals, wherein determining the multi-phase fluid measurements includes determining, using the flow rate based on the plurality of different acoustic signals, phase-specific flow characteristics of the fluid, and wherein the phase-specific flow characteristics include a phase-specific flow rate, a phase-specific viscosity, and a ratio of phases of the fluid.

Example 7 is the method of example 1, wherein receiving the signals includes receiving additional signals from a second sensing transducer that includes one or more spaced apart variable frequency acoustic emitters, wherein the second sensing transducer is positioned in the wellbore longitudinally spaced apart from the sensing transducer, and wherein converting the received signals to the flow rate includes converting the received signals and the received additional signals to the flow rate.

Example 8 is a flow sensor comprising: a housing positionable in a wellbore; and a plurality of variable frequency acoustic emitters coupled to the housing in a spaced-apart manner to output signals that represent different phases of a multi-phase fluid flowing in the wellbore.

Example 9 is the flow sensor of example 8, wherein the housing comprises a filler material, wherein variable frequency acoustic emitters of the plurality of variable frequency acoustic emitters are positioned in the filler material, wherein the filler material is shaped to conform to an interior of the wellbore, and wherein the filler material comprises a dissolvable composition.

Example 10 is the flow sensor of example 8, wherein variable frequency acoustic emitters of the plurality of variable frequency acoustic emitters are positioned circumferentially spaced apart in the housing, and wherein each variable frequency acoustic emitter is positioned in the flow sensor for generating acoustic signals corresponding to a different phase of the multi-phase fluid.

Example 11 is the flow sensor of example 8, wherein variable frequency acoustic emitters of the plurality of variable frequency acoustic emitters are positioned vertically spaced apart in the housing, and wherein each variable frequency acoustic emitter is positioned in the flow sensor for generating acoustic signals corresponding to a different phase of the multi-phase fluid.

Example 12 is the flow sensor of example 8, wherein the flow sensor is communicative couplable to a computing device for transmitting the signals to the computing device, wherein the computing device comprises: a processor; and a non-transitory computer-readable medium comprising instructions that are executable by the processor to cause the processor to perform operations comprising: training, using a training dataset, a machine-learning model to determine multi-phase measurements of the multi-phase fluid, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data; and applying the trained machine-learning model to the signals to determine multi-phase measurements of the multi-phase fluid.

Example 13 is the flow sensor of example 8, wherein the signals comprise a plurality of different acoustic signals, wherein the plurality of different acoustic signals is usable to determine phase-specific flow characteristics of the multi-phase fluid, and wherein the phase-specific flow characteristics include a phase-specific flow rate, a phase-specific viscosity, and a ratio of phases of the multi-phase fluid.

Example 14 is the flow sensor of example 8, wherein the plurality of variable frequency acoustic emitters comprises a symmetric fluidic oscillator, an asymmetric fluidic oscillator, or a hole-tone whistle.

Example 15 is a system comprising: a flow sensor positionable in a wellbore; and a plurality of variable frequency acoustic emitters positioned spaced apart in the flow sensor to output signals that represent different phases of a multi-phase fluid flowing in the wellbore.

Example 16 is the system of example 15, wherein variable frequency acoustic emitters of the plurality of variable frequency acoustic emitters are positioned circumferentially spaced apart in the flow sensor, and wherein each variable frequency acoustic emitter is positioned in the flow sensor for generating acoustic signals corresponding to a different phase of the multi-phase fluid.

Example 17 is the system of example 15, wherein variable frequency acoustic emitters of the plurality of variable frequency acoustic emitters are positioned vertically spaced apart in the flow sensor, and wherein each variable frequency acoustic emitter is positioned in the flow sensor for generating acoustic signals corresponding to a different phase of the multi-phase fluid.

Example 18 is the system of example 15, further comprising a computing device comprising: a processor; and a non-transitory computer-readable medium comprising instructions that are executable by the processor to cause the processor to perform operations comprising: training, using a training dataset, a machine-learning model to determine multi-phase measurements of the multi-phase fluid; and applying the trained machine-learning model to the signals to determine multi-phase measurements of the multi-phase fluid.

Example 19 is the system of any of examples 15 and 18, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data.

Example 20 is the system of example 15, wherein the plurality of variable frequency acoustic emitters includes at least one pair of matching variable frequency acoustic emitters, wherein a first variable frequency acoustic emitter is positioned to receive a first fluid flowing in the wellbore, wherein a second variable frequency acoustic emitter is positioned to receive a second fluid flowing the wellbore, and wherein acoustic signals from the first variable frequency acoustic emitter and the second variable frequency acoustic emitter are usable to determine whether a viscosity or density of the first fluid is different than a viscosity or density of the second fluid.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   generating acoustic signals using each variable frequency acoustic emitter of a plurality of variable frequency acoustic emitters by oscillating fluid passing through each variable frequency acoustic emitter of the plurality of variable frequency acoustic emitters, the plurality of variable frequency acoustic emitters positioned spaced apart in a sensing transducer that is positionable in an interior of a wellbore, the acoustic signals originating from oscillation of the oscillating fluid, the plurality of variable frequency acoustic emitters comprising a plurality of asymmetric fluidic oscillators, and each asymmetric fluidic oscillator of the plurality of asymmetric fluidic oscillators comprising an outlet channel that is asymmetric about an axis extending through a center of the asymmetric fluidic oscillator and following a flow of fluid through the asymmetric fluidic oscillator;
   receiving the acoustic signals emitted of the plurality of variable frequency acoustic emitters;
   converting the received acoustic signals into a flow rate of each of a plurality of different fluid phases of a fluid in the wellbore; and
   determining, using the flow rate, multi-phase fluid measurements of the fluid.

2. The method of claim 1, wherein variable frequency acoustic emitters of the plurality of variable frequency acoustic emitters are positioned circumferentially spaced apart at a common radius in the sensing transducer, and wherein each variable frequency acoustic emitter of the plurality of variable frequency acoustic emitters is positioned in the sensing transducer for generating the acoustic signals corresponding to a different phase of the fluid in the wellbore.

3. The method of claim 1, wherein variable frequency acoustic emitters of the plurality of variable frequency acoustic emitters are positioned vertically spaced apart in the sensing transducer, and wherein each variable frequency acoustic emitter of the plurality of variable frequency acoustic emitters is positioned in the sensing transducer for generating the acoustic signals corresponding to a different phase of the fluid in the wellbore.

4. The method of claim 1, further comprising:
   training, using a training dataset, a machine-learning model to determine the multi-phase measurements of the fluid, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data; and
   applying the trained machine-learning model to the flow rate to determine the multi-phase measurements of the fluid.

5. The method of claim 1, wherein the received acoustic signals comprise a plurality of different acoustic signals, wherein determining the multi-phase fluid measurements includes determining, using the flow rate based on the plurality of different acoustic signals, phase-specific flow characteristics of the fluid, and wherein the phase-specific flow characteristics include a phase-specific flow rate, a phase-specific viscosity, and a ratio of phases of the fluid.

6. The method of claim 1, wherein receiving the acoustic signals includes receiving additional acoustic signals from a second sensing transducer that includes one or more spaced apart variable frequency acoustic emitters, wherein the second sensing transducer is positioned in the wellbore longitudinally spaced apart from the sensing transducer, and wherein converting the received acoustic signals to the flow rate includes converting the received acoustic signals and the received additional acoustic signals to the flow rate.

7. A flow sensor comprising:
   a housing positionable in a wellbore; and
   a plurality of variable frequency acoustic emitters coupled to the housing in a spaced-apart manner to output acoustic signals that represent different phases of a multi-phase fluid flowing in the wellbore, wherein the acoustic signals are generatable in response to each variable frequency acoustic emitter of the plurality of variable frequency acoustic emitters receiving oscillating fluid passing through each variable frequency acoustic emitter of the plurality of variable frequency acoustic emitters, wherein the acoustic signals are generatable from oscillation of the oscillating fluid, wherein the plurality of variable frequency acoustic emitters comprises a plurality of asymmetric fluidic oscillators, and wherein each asymmetric fluidic oscillator of the plurality of asymmetric fluidic oscillators comprises an outlet channel that is asymmetric about an axis extending through a center of the asymmetric fluidic oscillator and following a flow of fluid through the asymmetric fluidic oscillator.

8. The flow sensor of claim 7, wherein the housing comprises a filler material, wherein variable frequency acoustic emitters of the plurality of variable frequency acoustic emitters are positioned in the filler material, wherein the filler material is shaped to conform to an interior of the wellbore, and wherein the filler material comprises a dissolvable composition.

9. The flow sensor of claim 7, wherein variable frequency acoustic emitters of the plurality of variable frequency acoustic emitters are positioned circumferentially spaced apart at a common radius in the housing, and wherein each variable frequency acoustic emitter of the plurality of variable frequency acoustic emitters is positioned in the flow sensor for generating the acoustic signals corresponding to a different phase of the multi-phase fluid.

10. The flow sensor of claim 7, wherein variable frequency acoustic emitters of the plurality of variable frequency acoustic emitters are positioned vertically spaced apart in the housing, and wherein each variable frequency acoustic emitter is positioned in the flow sensor for generating the acoustic signals corresponding to a different phase of the multi-phase fluid.

11. The flow sensor of claim 7, wherein the flow sensor is communicatively couplable to a computing device for transmitting the acoustic signals to the computing device, wherein the computing device comprises:
- a processor; and
- a non-transitory computer-readable medium comprising instructions that are executable by the processor to cause the processor to perform operations comprising:
  - training, using a training dataset, a machine-learning model to determine multi-phase measurements of the multi-phase fluid, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data; and
  - applying the trained machine-learning model to the acoustic signals to determine multi-phase measurements of the multi-phase fluid.

12. The flow sensor of claim 7, wherein the acoustic signals comprise a plurality of different acoustic signals, wherein the plurality of different acoustic signals is usable to determine phase-specific flow characteristics of the multi-phase fluid, and wherein the phase-specific flow characteristics include a phase-specific flow rate, a phase-specific viscosity, and a ratio of phases of the multi-phase fluid.

13. A system comprising:
- a flow sensor positionable in a wellbore; and
- a plurality of variable frequency acoustic emitters positioned spaced apart in the flow sensor to output acoustic signals that represent different phases of a multi-phase fluid flowing in the wellbore, wherein the acoustic signals are generatable in response to each variable frequency acoustic emitter of the plurality of variable frequency acoustic emitters receiving oscillating fluid passing through each variable frequency acoustic emitter of the plurality of variable frequency acoustic emitters, wherein the acoustic signals are generatable from oscillation of the oscillating fluid, wherein the plurality of variable frequency acoustic emitters comprises a plurality of asymmetric fluidic oscillators, and wherein each asymmetric fluidic oscillator of the plurality of asymmetric fluidic oscillators comprises an outlet channel that is asymmetric about an axis extending through a center of the asymmetric fluidic oscillator and following a flow of fluid through the asymmetric fluidic oscillator.

14. The system of claim 13, wherein variable frequency acoustic emitters of the plurality of variable frequency acoustic emitters are positioned circumferentially spaced apart at a common radius in the flow sensor, and wherein each variable frequency acoustic emitter of the plurality of variable frequency acoustic emitters is positioned in the flow sensor for generating the acoustic signals corresponding to a different phase of the multi-phase fluid.

15. The system of claim 13, wherein variable frequency acoustic emitters of the plurality of variable frequency acoustic emitters are positioned vertically spaced apart in the flow sensor, and wherein each variable frequency acoustic emitter of the plurality of variable frequency acoustic emitters is positioned in the flow sensor for generating the acoustic signals corresponding to a different phase of the multi-phase fluid.

16. The system of claim 13, further comprising a computing device comprising:
- a processor; and
- a non-transitory computer-readable medium comprising instructions that are executable by the processor to cause the processor to perform operations comprising:
  - training, using a training dataset, a machine-learning model to determine multi-phase measurements of the multi-phase fluid; and
  - applying the trained machine-learning model to the acoustic signals to determine multi-phase measurements of the multi-phase fluid.

17. The system of claim 16, wherein the training dataset includes measured data, synthetic data, or a combination of the measured data and the synthetic data, wherein the measured data comprises historical multi-phase fluid measurements, and wherein the synthetic data comprises synthetically generated multi-phase fluid data.

18. The system of claim 13, wherein the plurality of variable frequency acoustic emitters includes at least one pair of matching variable frequency acoustic emitters, wherein a first variable frequency acoustic emitter is positioned to receive a first fluid flowing in the wellbore, wherein a second variable frequency acoustic emitter is positioned to receive a second fluid flowing in the wellbore, and wherein acoustic signals from the first variable frequency acoustic emitter and the second variable frequency acoustic emitter are usable to determine whether a viscosity or density of the first fluid is different than a viscosity or density of the second fluid.

\* \* \* \* \*